United States Patent Office.

RENÉ BOHN, OF MANNHEIM, GERMANY, ASSIGNOR TO THE BADISCHE ANILIN AND SODA FABRIK, OF LUDWIGSHAFEN, GERMANY.

BLUE DYE.

SPECIFICATION forming part of Letters Patent No. 627,896, dated June 27, 1899.

Application filed November 16, 1898. Serial No. 696,622. (Specimens.)

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of a new Blue Dyestuff, of which the following is a specification.

In the preparation of naphthazarin 1.1'-dinitro-naphthalene is treated with sulfuric acid, preferably in the presence of a reducing agent, such as zinc or sulfur. This treatment results in the production of a product which is soluble in water, giving a bright blue solution, and which is known as "naphthazarin intermediate product." (See Ber. IV, 439.) If this body be treated with a reducing agent, a leuco product is obtained.

My present invention relates to the production of a new and most beautiful blue coloring-matter by sulfonating this leuco compound.

My new coloring-matter has the valuable property of yielding very clear blue shades on mordanted and on unmordanted wool. These shades are of a purity which could hitherto only be achieved with the aid of anilin colors.

My new coloring-matter is characterized by the following properties: It can be readily obtained in the form of crystalline needles, which are of an indigo-blue color. It dissolves in water, giving a blue solution, its concentrated sulfuric-acid solution is yellow, and on adding caustic-soda solution in water the color is blue, but an excess of caustic soda-lye precipitates the coloring-matter.

On heating my new coloring-matter with dilute sulfuric or dilute hydrochloric acid a magenta-red color is obtained.

The following example will serve to illustrate the manner in which my invention can best be carried into practical effect. Parts are by weight. Add about ten (10) parts of leuco compound, which can be obtained as hereinbefore set forth, to one hundred (100) parts of fuming sulfuric acid, (containing about twenty-three per cent. free $SO_3$). Heat the mixture while stirring for about two (2) hours at a temperature of 100° centigrade. Allow the melt to cool, and then pour it onto about two thousand (2,000) parts of ice, and precipitate the coloring-matter with common salt.

My new coloring-matter can be applied in dyeing either as such—that is, directly in the form obtained on following the above example—or it can be applied in the form of its leuco compound, which can be obtained in the well-known way by reducing the coloring-matter with, for instance, stannous chlorid and hydrochloric acid, or sodium hyposulfite.

The coloring-matter itself and its leuco compounds are for practical purposes the equivalents of one another, and this application is intended to cover the new product in both forms.

Now what I claim is—

As a new article of manufacture the blue coloring-matter which can be obtained by treating with sulfuric acid the leuco compound of the herein-described blue naphthazarin intermediate product and which gives a blue solution with water, a yellow color with concentrated sulfuric acid and a magenta-red color on heating with dilute sulfuric acid, all as hereinbefore described.

In testimony whereof I have hereunto set my hand in the presence of two subscribing witnesses.

RENÉ BOHN.

Witnesses:
   GUSTAV L. LICHTENBERGER,
   ADOLPH REUTHLINGER.